United States Patent
Tsujimoto et al.

(10) Patent No.: US 8,226,300 B2
(45) Date of Patent: Jul. 24, 2012

(54) TAPERED ROLLER BEARING

(75) Inventors: Takashi Tsujimoto, Iwata (JP);
Yasuhiro Kanbori, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 12/663,571

(22) PCT Filed: May 29, 2008

(86) PCT No.: PCT/JP2008/059909
§ 371 (c)(1),
(2), (4) Date: Dec. 8, 2009

(87) PCT Pub. No.: WO2008/152921
PCT Pub. Date: Dec. 18, 2008

(65) Prior Publication Data
US 2010/0178004 A1     Jul. 15, 2010

(30) Foreign Application Priority Data

Jun. 15, 2007   (JP) ................ 2007-158876

(51) Int. Cl.
*F16C 33/58* (2006.01)
*F16C 19/00* (2006.01)
*F16C 33/56* (2006.01)

(52) U.S. Cl. .................. 384/571; 384/450; 384/576
(58) Field of Classification Search .......... 384/450, 384/571, 576
See application file for complete search history.

(56) References Cited

U.S. PATENT DOCUMENTS

| | | | | |
|---|---|---|---|---|
| 1,736,037 A * | 11/1929 | Else | ................. | 384/565 |
| 2,922,491 A * | 1/1960 | Macks | ............... | 184/109 |
| 3,447,849 A * | 6/1969 | Harris et al. | ............ | 384/450 |
| 3,909,087 A * | 9/1975 | Cairns | ............... | 384/293 |
| 4,915,513 A * | 4/1990 | Orain | ............... | 384/447 |
| 5,236,264 A * | 8/1993 | Matsubara et al. | ......... | 384/49 |
| 5,852,947 A * | 12/1998 | Tsujimoto et al. | ......... | 74/339 |
| 5,961,221 A * | 10/1999 | Kamimura | ............ | 384/447 |

(Continued)

FOREIGN PATENT DOCUMENTS

EP    1 746 298    1/2007

(Continued)

OTHER PUBLICATIONS

International Preliminary Report on Patentability and Written Opinion of the International Searching Authority mailed Dec. 30, 2009 in International(PCT) Application No. PCT/JP2008/059909.

(Continued)

*Primary Examiner* — Thomas R Hannon
*Assistant Examiner* — Adam D Rogers
(74) *Attorney, Agent, or Firm* — Wenderoth, Lind & Ponack, L.L.P.

(57) ABSTRACT

A tapered roller bearing is capable of suppressing the occurrence of fretting without shortening its fatigue life. The tapered roller bearing includes an outer race, an inner race, a plurality of taper rollers interposed between the outer race and the inner race, and a retainer for retaining the tapered rollers. The tapered roller bearing is used in an idler portion of an automobile transmission, which is interchanged between an idle state in which the outer race idles with respect to the inner race and a shift state in which the outer race and the inner race are rotated synchronously with each other. A ratio of $\alpha/\beta \geq 4.9$ is established on a premise that an outer-race raceway surface angle is $2\alpha$ and a roller angle is $\beta$.

10 Claims, 7 Drawing Sheets

U.S. PATENT DOCUMENTS

| | | | | |
|---|---|---|---|---|
| 5,975,762 | A * | 11/1999 | Ai | 384/450 |
| 6,086,261 | A * | 7/2000 | Nakagawa et al. | 384/571 |
| 6,261,004 | B1 * | 7/2001 | Tsujimoto et al. | 384/571 |
| 6,328,477 | B1 * | 12/2001 | Tsujimoto et al. | 384/450 |
| 6,502,996 | B2 * | 1/2003 | Joki | 384/571 |
| 6,547,443 | B2 * | 4/2003 | Hanai et al. | 384/571 |
| 6,860,640 | B2 * | 3/2005 | Matsuyama et al. | 384/571 |
| 6,869,222 | B1 * | 3/2005 | Fujiu et al. | 384/462 |
| 7,296,933 | B2 * | 11/2007 | Tsujimoto | 384/571 |
| 7,484,895 | B2 * | 2/2009 | Matsuyama et al. | 384/571 |
| 7,722,257 | B2 * | 5/2010 | Tabata et al. | 384/571 |
| 7,753,593 | B2 * | 7/2010 | Tsujimoto | 384/448 |
| 7,789,570 | B2 * | 9/2010 | Tsujimoto | 384/572 |
| 7,871,201 | B2 * | 1/2011 | Ohshima et al. | 384/564 |
| 2002/0044707 | A1 | 4/2002 | Hanai et al. | |
| 2004/0047528 | A1 * | 3/2004 | Tsujimoto et al. | 384/571 |
| 2004/0114843 | A1 * | 6/2004 | Shimomura et al. | 384/569 |
| 2007/0177838 | A1 | 8/2007 | Tsujimoto | |
| 2007/0230852 | A1 * | 10/2007 | Tabata et al. | 384/576 |
| 2009/0003745 | A1 | 1/2009 | Tsujimoto | |

FOREIGN PATENT DOCUMENTS

| | | |
|---|---|---|
| JP | 2000-193069 | 7/2000 |
| JP | 2002-213456 | 7/2002 |
| JP | 2003-314542 | 11/2003 |
| JP | 2005-106234 | 4/2005 |
| JP | 2007-132469 | 5/2007 |

OTHER PUBLICATIONS

International Search Report issued Jun. 24, 2008 in International (PCT) Application No. PCT/JP2008/059909.

Supplementary European Search Report issued Oct. 17, 2011 in corresponding European Patent Application No. 08776971.7.

* cited by examiner

IN CONTACT
[IN STATIC STATE]

[AT INITIAL STAGE OF OPERATION]

CENTERING OF RETAINER
[DURING OPERATION]

TAPERED ROLLER BEARING

TECHNICAL FIELD

The present invention relates to a tapered roller bearing, and more specifically, to a tapered roller bearing used in an idler portion of an automobile transmission (transmission).

BACKGROUND ART

Examples of the transmission includes a synchromesh transmission illustrated in FIG. 6. In this transmission, a main shaft 5 and an auxiliary shaft (not shown) arranged in parallel at a predetermined interval are rotatably supported in a mission case (not shown). The main shaft 5 is interlocked with an output shaft (on a drive wheel side), and the auxiliary shaft is interlocked with an input shaft (on an engine side).

An auxiliary shaft gear 6 is integrally (or separately) provided to the auxiliary shaft, and a main shaft gear 1 is mounted rotatably to the main shaft 5 through an intermediation of a tapered roller bearing A. At a central portion of an outer peripheral surface of the main shaft gear 1, there is integrally provided a teeth portion 1a constantly meshing with the auxiliary shaft gear 6, and clutch gears 7 are coupled with both end portions thereof in an engaging manner. The clutch gears 7 integrally include spline teeth 7a on outer peripheries thereof, and a conical cone 7b on one side thereof. A synchronism mechanism 8 is arranged close to the clutch gears 7.

A synchronism mechanism 8 includes a sleeve 81 moving in an axial direction (in lateral direction in FIG. 6) in accordance with operation of a selector (not shown), a synchronizer key 82 mounted to an inner periphery of the sleeve 81 so as to be movable in the axial direction, a hub 83 coupled with an outer periphery of the main shaft 5 in an engaging manner, a synchronizer ring 84 slidably mounted to an outer periphery of the cone 7b of the clutch gears 7, and a presser pin 85 and a spring 86, which are provided for elastically pressing the synchronizer key 82 to the inner periphery of the sleeve 81.

In a state illustrated in FIG. 6, the sleeve 81 and the synchronizer key 82 are retained at a neutral position by the presser pin 85. In this case, the main shaft gear 1 idles with respect to the main shaft 5 together with rotation of the auxiliary shaft gear 6. Meanwhile, in accordance with operation of a selector, when the sleeve 81 is moved, for example, to the left side in the axial direction in the state illustrated in FIG. 6, the synchronizer key 82 follows the sleeve 81 and moves to the left side in the axial direction, with the result that the synchronizer ring 84 is pressed against an inclination surface of the cone 7b of the clutch gears 7. In this manner, a rotational speed on the clutch gears 7 side is decreased, and in contrast, a rotational speed on the synchronism mechanism 8 side is increased.

Then, when the rotational speeds of both the clutch gears 7 and the synchronism mechanism 8 are synchronized with each other, the sleeve 81 further moves to the left side in the axial direction so as to mesh with the spline teeth 7a of the clutch gears 7, and the main shaft gear 1 and the main shaft 5 are coupled with each other through an intermediation of the synchronism mechanism 8. With this, the rotation of the auxiliary shaft gear 6 is decreased by the main shaft gear 1 at a predetermined transmission gear ration, and is transmitted to the main shaft 5. In this case, the main shaft gear 1 is rotated synchronously with the main shaft 5 and a bearing inner race 2 of the tapered roller bearing A.

The tapered roller bearing A used in a main shaft gear mechanism of the synchromesh transmission of an automobile is constituted by the main shaft gear 1 also serving as a bearing outer race, a pair of bearing inner races 2 each including a raceway surface 2a on an outer peripheral surface thereof and fitted to an outer periphery of the main shaft 5, a plurality of tapered rollers 3 arranged between double-row raceway surfaces 1c of the main shaft gear 1 and the raceway surface 2a of each of the pair of bearing inner races 2, and a pair of retainers 4 for retaining the tapered rollers 3 in the rows, respectively.

Incidentally, at the time of speed change described above, the main shaft gear 1 and the bearing inner race 2 are rotated synchronously with each other, with the result that the rollers 3 serving as rolling elements enter a halt state on the raceway surfaces 1c and 2a. Meanwhile, repetitive action of external vibrations or the like causes repetitive slight slippage between the rollers 3 and the raceway surfaces 1c and 2a, with the result that a phenomenon called fretting in which contact surfaces are worn owing to the relative repetitive slight slippage may become a problem.

In this context, in order to suppress the above-mentioned fretting, it is possible to perform parkerizing (phosphating) on the main shaft gear, the raceway surfaces of the bearing inner races, and the rollers so as to reduce frictional resistance between the rollers and the raceway surfaces. However, parkerizing coating may be worn and damaged, and hence it is impossible to expect a long-term satisfactory effect of suppressing fretting.

Further, there has been conventionally disclosed a tapered roller bearing (Patent Document 1) including an imbalance means utilizing non-equiangular arrangement of tapered rollers, circumferential imbalance in weight of a retainer for retaining the tapered rollers, and non-uniformity in weight of the tapered rollers. That is, a moment of inertia is utilized by shifting a center of gravity of the retainer from a rotational center thereof so as to cause relative rotation in a halt state.
Patent Document 1: JP 2000-193069 A

SUMMARY OF THE INVENTION

Problem to be Solved by the Invention

However, in order to arrange pockets of a retainer at unequal pitches or the like, it is necessary to decrease the number of rollers in comparison with the case of equal pitches, which is not preferred because bearing life is shorten owing to a decrease in load capacity. Thus, a tapered roller bearing used in an idler portion of a transmission is necessary to be excellent in fretting resistance and simultaneously have longer life.

The present invention has been made in view of the above-mentioned problem. It is therefore an object of the present invention to provide a tapered roller bearing capable of suppressing occurrence of fretting without shortening fatigue life thereof.

Means for Solving the Problems

According to the present invention, there is provided a tapered roller bearing, including: an outer race; an inner race; a plurality of taper rollers interposed between the outer race and the inner race; a retainer for retaining the tapered rollers, the tapered roller bearing being used in an idler portion of an automobile transmission, which is interchanged between an idle state in which the outer race idles with respect to the inner race and a shift state in which the outer race and the inner race are rotated synchronously with each other, in which $\alpha/\beta \geq 4.9$ is established on a premise that an outer-race raceway surface angle is $2\alpha$ and a roller angle is $\beta$.

The inventor of the present invention confirmed the following through an examination: fretting abrasion occurred when the roller and a raceway surface were rotated synchronously with each other and contact surface pressure therebetween exceeded 2,200 MPa. Further, necessary dynamic load rating is determined in accordance with necessary life of the bearing. In this context, in order to set the contact surface pressure to be lower than 2,200 MPa, it is necessary to determine a ratio of static load rating to the dynamic load rating. Meanwhile, the ratio of static load rating to the dynamic load rating correlates with a ratio of the roller angle to the outer-race raceway surface angle. That is, when $\alpha/\beta \geq 4.9$ is established on the premise that the outer-race raceway surface angle is $2\alpha$ and the roller angle is $\beta$, it is possible to set the contact surface pressure between the roller and the raceway surface to be lower than 2,200 MPa.

According to the present invention, there is provided a tapered roller bearing, including: an outer race; an inner race; a plurality of taper rollers interposed between the outer race and the inner race; a retainer for retaining the tapered rollers, the tapered roller bearing being used in an idler portion of an automobile transmission, which is interchanged between an idle state in which the outer race idles with respect to the inner race and a shift state in which the outer race and the inner race are rotated synchronously with each other, in which: $MoS_2$ treatment is performed on a surface of the tapered roller; and $\alpha/\beta \geq 4.75$ is established on a premise that an outer-race raceway surface angle is $2\alpha$ and a roller angle is $\beta$.

The $MoS_2$ treatment represents treatment in which a surface layer portion of a member to be coated (surface layer portion of a base material) is coated with $MoS_2$ (molybdenum disulfide). For example, the surface layer portion of the base material is molten by heat so that molybdenum disulfide is recrystallized after being taken therein. Thus, the coated layer is resistant to abrasion, less liable to be peeled off, and excellent in an effect of reducing sliding resistance. As described above, through $MoS_2$ treatment performed on the surface of the tapered roller, it is possible to reduce frictional resistance between the tapered rollers and raceway surfaces of the outer race and the inner race.

A roller coefficient $\gamma$ may be set to exceed 0.94, and an aperture angle formed in a pocket of the retainer may be set to 55° or larger and 80° or smaller. In this case, the roller coefficient $\gamma$ is defined by the following formula. Further, the aperture angle of the pocket (formed between the brace portions adjacent to each other in the circumferential direction) represents an angle formed between surfaces of the brace portions, which are brought into contact with a rolling surface of each of the tapered rollers.

$$\text{Roller coefficient } \gamma = (Z \cdot DA)/(\pi \cdot PCD)$$

where Z is the number of rollers, DA is an average diameter of rollers, and PCD is a pitch circle diameter of rollers.

The retainer may be made of a resin. Examples of the adoptable resin include polyamide and engineering plastics such as polyphenylene sulfide.

Effects of the Invention

In the tapered roller bearing of the present invention, it is possible to set the contact surface pressure between the tapered roller and the raceway surface to be lower than 2,200 MPa, and hence possible to suppress occurrence of fretting without shortening fatigue life thereof.

In particular, through $MoS_2$ treatment performed on the surface of the tapered roller, even when the contact surface pressure between the tapered roller and the raceway surface does not become lower than 2,200 MPa, it is possible to prevent occurrence of fretting at surface pressure approximate to 2,200 MPa as long as $\alpha/\beta \geq 4.75$ is established. Thus, a relation between the outer-race raceway surface angle and the roller angle is set more easily, which leads to an increase in degree of freedom for design.

When the roller coefficient $\gamma$ is set to exceed 0.94, it is possible to increase the width of the brace of the retainer while the outer race and the retainer are kept out of contact with each other in the neutral state. Thus, without changing the bearing dimension, it is possible to increase the load capacity to the same level as that of a full complement roller bearing (bearing without retainer). With this, it is possible to reduce contact surface pressure, the surface pressure is lessened in a halt state, and fretting resistance is enhanced. In addition, an excellent contact state can be secured between the retainer and the tapered rollers, and hence the rollers can be smoothly rolled.

Further, setting of the aperture angle of the retainer to be 55° or larger allows an excellent contact state to be secured with respect to the tapered rollers. Setting of the aperture angle of the retainer to be 80° or smaller prevents an increase in pressing force in a radial direction, and hence the rollers can be smoothly rolled.

By using the retainer made of a resin, the retainer is reduced in weight and frictional coefficient, and hence the resin becomes suitable for suppressing torque loss and abrasion of the retainer at the time of activating the bearing. In particular, it is suitable that the resin include polyamide and engineering plastics such as polyphenylene sulfide.

Figure 1:
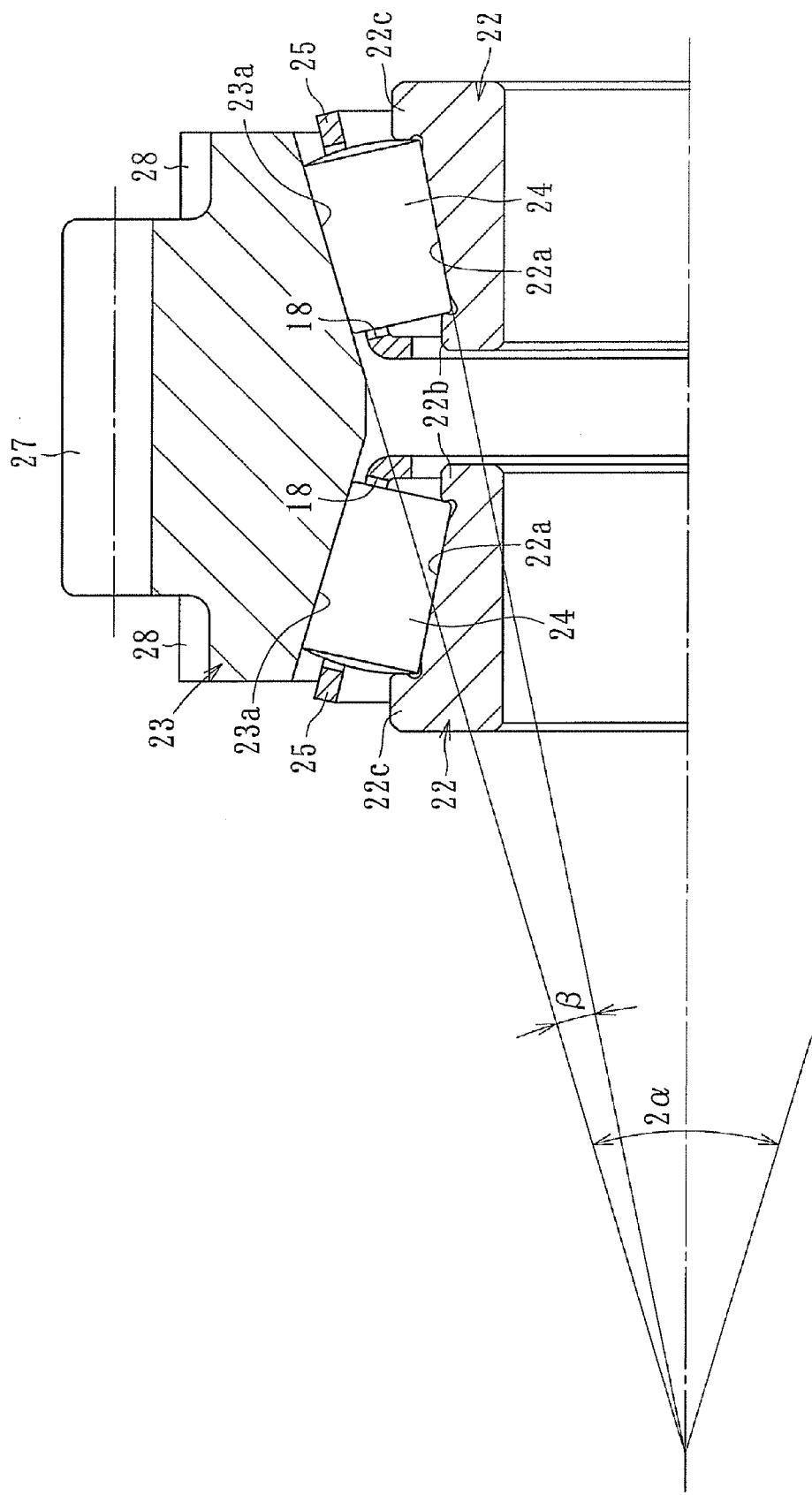
FIG. 1 is a sectional view of a main part of an automobile transmission in which a tapered roller bearing according to an embodiment of the present invention is used.

| Description of the Reference Numerals | |
|---|---|
| 22 | inner race |
| 23 | outer race |
| 24 | tapered roller |
| 25 | retainer |

DETAILED DESCRIPTION OF THE INVENTION

Description is made on a tapered roller bearing of the present invention with reference to FIGS. 1 to 5.

FIG. 1 illustrates an automobile transmission (synchromesh transmission) in which a tapered roller bearing according to an embodiment of the present invention is used. A main shaft and an auxiliary shaft are arranged in parallel at a predetermined interval. The main shaft is interlocked with an output shaft on a drive wheel side, and the auxiliary shaft is interlocked with an input shaft on an engine side. That is, the auxiliary shaft is provided with an auxiliary shaft gear, and a main shaft gear constituting an outer race of the tapered roller bearing of the present invention meshes with the auxiliary shaft gear.

That is, the tapered roller bearing includes a pair of inner races 22 each having a tapered raceway surface 22a, an outer race 23 having a pair of tapered raceway surfaces 23a, a plurality of tapered rollers 24 arranged so as to be rollable between the raceway surface 22a of each of the inner races 22 and the respective raceway surfaces 23a of the outer race 23, and a retainer 25 for retaining the tapered rollers 24 at equiangular intervals. In each of the inner races 22, a small flange 22b is provided on a radially smaller side thereof, and a large flange 22c is provided on a radially larger side thereof.

Further, on an outer peripheral surface of the outer race 23, there is provided a teeth portion 27 meshing with the auxiliary shaft gear of the auxiliary shaft, and on an axial end portion thereof, there are provided teeth portions 28 with which clutch gears (not shown) mesh. Further, while not shown, a synchronism mechanism is arranged close to the clutch gears.

That is, at the time of neutral, the outer race (main shaft gear) 23 idles with respect to the inner races 22. Meanwhile, at the time of speed change performed by the outer race (main shaft gear) 23, the outer race (main shaft gear) 23 is rotated synchronously with the inner races 22 and the main shaft through interlocking through an intermediation of the synchronism mechanism.

On a premise that an outer-race raceway surface angle is $2\alpha$ and a roller angle is $\beta$, $\alpha/\beta \geq 4.9$ is established. Contact surface pressure between the tapered rollers 24 and the raceway surfaces 23a is determined by necessary dynamic load rating in accordance with necessary life of the bearing and by a ratio of static load rating to the dynamic load rating. Further, the ratio of the static load rating to the dynamic load rating correlates with a ratio of the roller angle to an outer-race raceway surface angle. Thus, when $\alpha/\beta \geq 4.9$ is established, it is possible to set the contact surface pressure between the tapered rollers 24 and the raceway surfaces 23a to be lower than 2,200 MPa.

Figure 2:
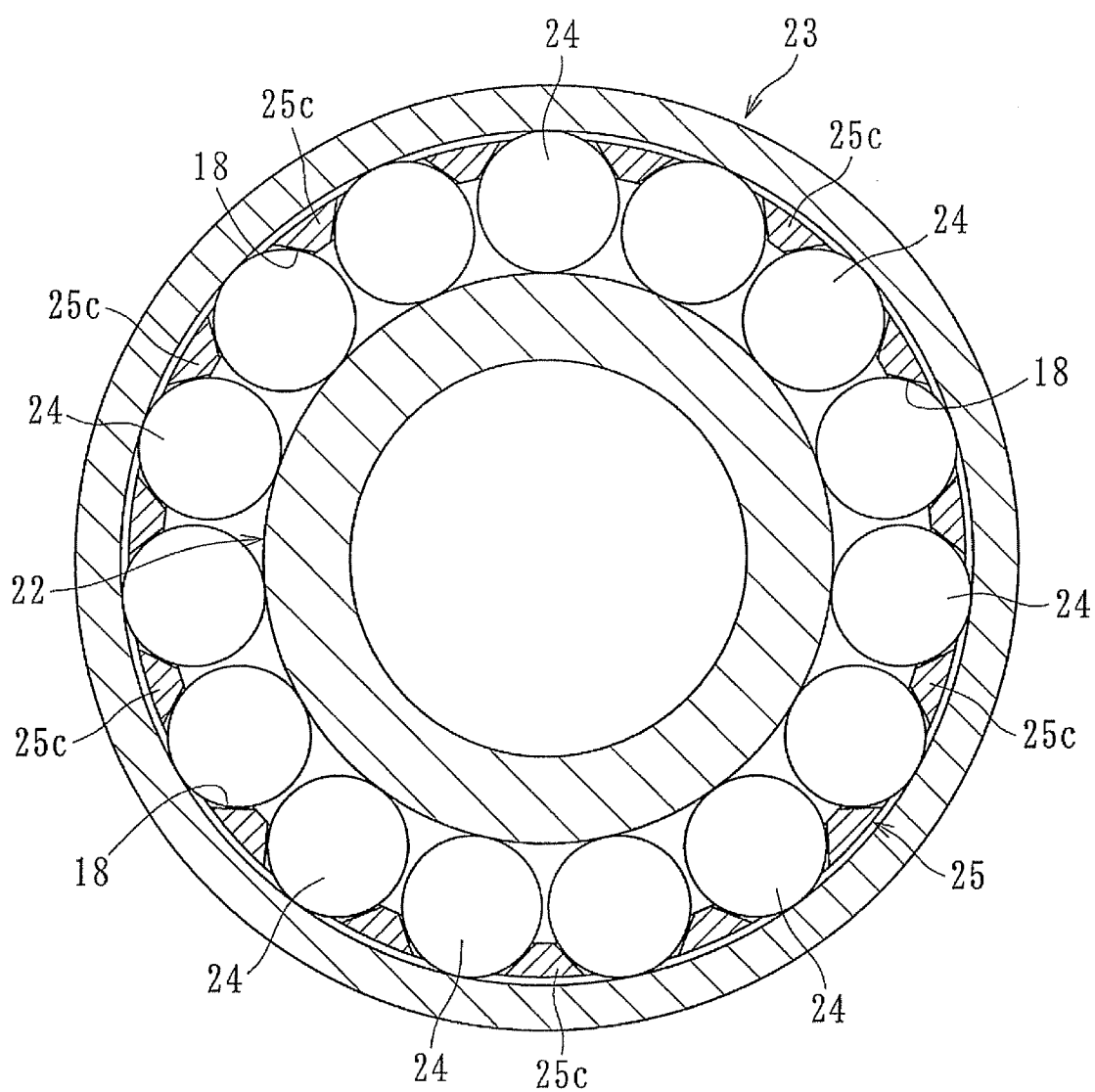
FIG. 2 is a lateral sectional view of the tapered roller bearing.

Note that, as illustrated in FIGS. 2 and 3, the retainer includes a radially-smaller-side annular portion 25a, a radially-larger-side annular portion 25b, and a plurality of brace portions 25c for coupling the radially-smaller-side annular portion 25a and the radially-larger-side annular portion 25b with each other in an axial direction. An aperture pressing-angle (aperture angle) θ (refer to FIG. 5) formed between brace surfaces 25d of the brace portions 25c adjacent to each other is set to 55° or larger and 80° or smaller, for example.

A roller coefficient γ is set to be larger than 0.94. In this case, the roller coefficient γ is defined by the following formula. Further, the aperture angle θ of the pocket 18 (formed between the brace portions adjacent to each other in the circumferential direction) represents an angle formed between surfaces of the brace portions, which are brought into contact with a rolling surface of each of the tapered rollers 24.

Roller coefficient $\gamma = (Z \cdot DA)/(\pi \cdot PCD)$ where Z is the number of the rollers, DA is an average diameter of the rollers, and PCD is a pitch circle diameter of the rollers.

The retainer 25 is formed, for example, by press-molding a metal plate into a frusto-conical shape and then forming pockets 18 by press punching. Examples of the metal plate used therefor may include a rolled steel sheet such as a cold-rolled steel sheet (SPC) and a hot-rolled mild steel sheet (SPH), and spring steel. Further, when the cold-rolled steel sheet (SPC) or the hot-rolled mild steel sheet (SPH) is used, it is preferred to perform surface hardening on the surfaces thereof, such as nitrocarburizing treatment and gas nitrocarburizing treatment.

Herein, nitrocarburizing represents a method of performing nitriding simultaneously with carburizing so as to disperse carbon C and nitrogen N. For example, nitrocarburizing is performed at temperature of, for example, approximately 850° C. in normal carburizing gas atmosphere into which ammonia ($NH_3$) (approximately 0.5 to 1.0%) is added. Further, gas nitrocarburizing represents a method of performing nitrocarburizing with gas, and is performed by mixing an ammonia gas and a carburizing gas or by using ammonia obtained by breaking down urea. Nitrocarburizing in which a gas obtained by mixing the ammonia gas and the carburizing gas with each other at 1:1 is a mainstream of gas nitrocarburizing.

Further, instead of a metal plate, the retainer 25 may be made of a resin, that is, made of engineering plastics. Herein, the engineering plastics represent a synthetic resin excellent mainly in thermal resistance and capable of being used in fields in which strength is required, and is abbreviated as "enpla." Further, the engineering plastics include general-purpose engineering plastics and super engineering plastics, both of which may be used for forming the retainer 25. Typical examples of the engineering plastics include the following. Note that, the following are mere examples of the engineering plastics, and hence the engineering plastics are not limited thereto.

Examples of the general-purpose engineering plastics include polycarbonate (PC), polyamide 6 (PA6), polyamide 66 (PA66), polyacetal (POM), modified polyphenylene ether (m-PPE), polybutylene terephthalate (PBT), GF-reinforced polyethylene terephthalate (GF-PET), and ultra high molecular weight polyethylene (UHMW-PE). Further, examples of the super engineering plastics include polysulfone (PSF), polyether sulfone (PES), polyphenylene sulfide (PPS), polyarylate (PAR), polyamideimide (PAI), polyetherimide (PEI), polyetheretherketone (PEEK), liquid crystal polymer (LCP), thermoplastic polyimide (TPI), polybenzimidazole (PBI), polymethylpentene (TPX), poly(1,4-cyclohexanedimethylene terephthalate) (PCT), polyamide 46 (PA46), polyamide 6T (PA6T), polyamide 9T (PA9T), polyamide 11, 12 (PA11, 12), fluororesins, and polyphthalamide (PPA).

It is preferred to perform $MoS_2$ treatment on the surfaces of the tapered rollers. Herein, the $MoS_2$ treatment represents treatment in which a surface layer portion of a member to be coated (surface layer portion of a base material) is coated with $MoS_2$ (molybdenum disulfide). For example, the surface layer portion of the base material is molten by heat so that molybdenum disulfide is recrystallized after being taken therein. Thus, the coated layer is resistant to abrasion, less liable to be peeled off, and excellent in an effect of reducing sliding resistance.

Figure 3A:
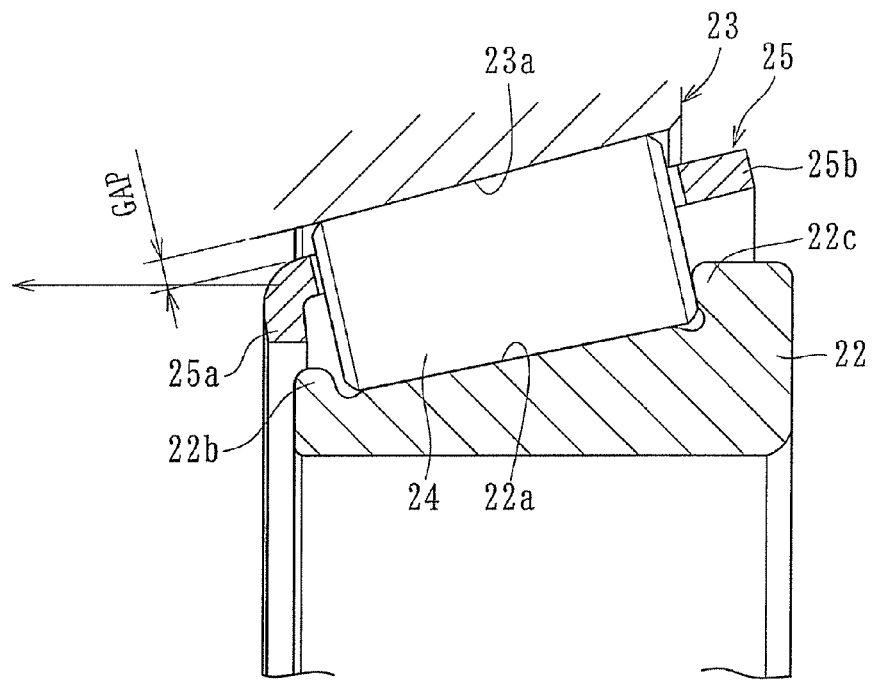
FIG. 3A is a vertical sectional view of the tapered roller bearing before being moved.
Figure 3B:
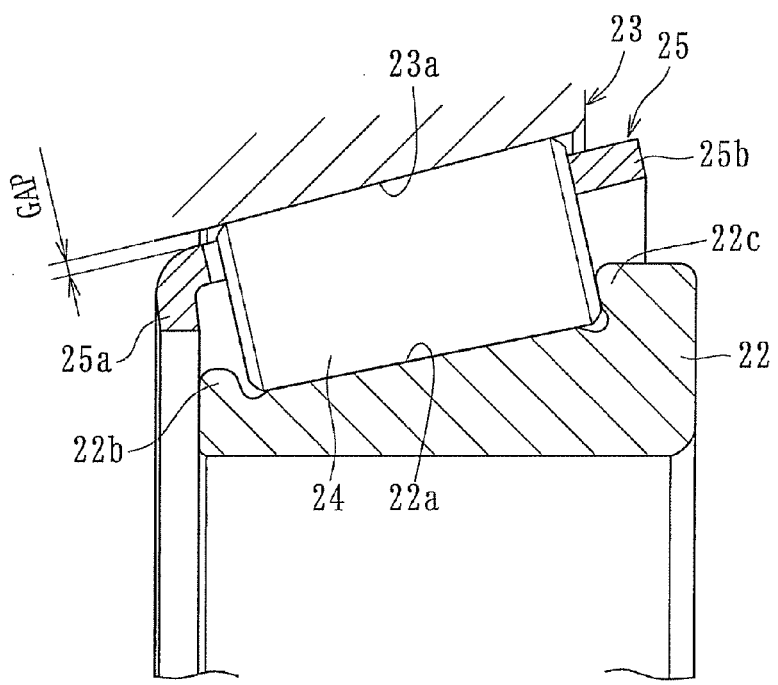
FIG. 3B is a vertical sectional view of the tapered roller bearing after being moved.
Figure 4A:
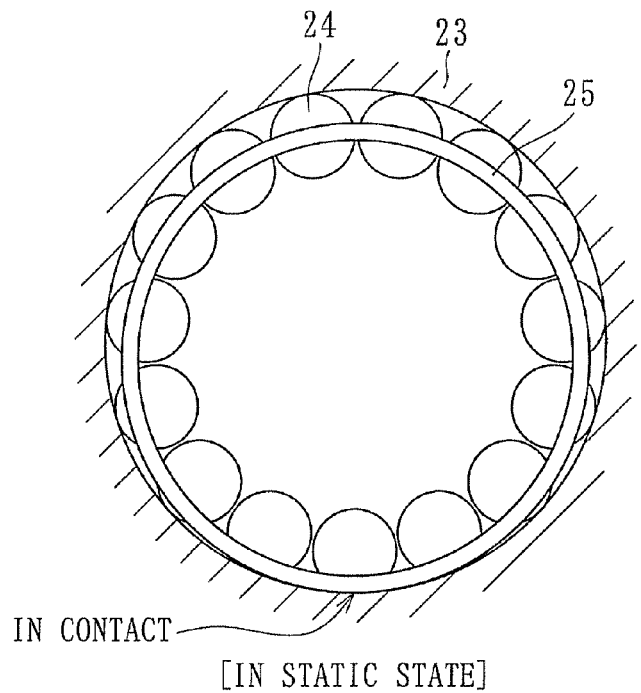
FIG. 4A is a sectional view illustrating a relation between a retainer and an outer race of the tapered roller bearing in a stationary state.
Figure 4B:
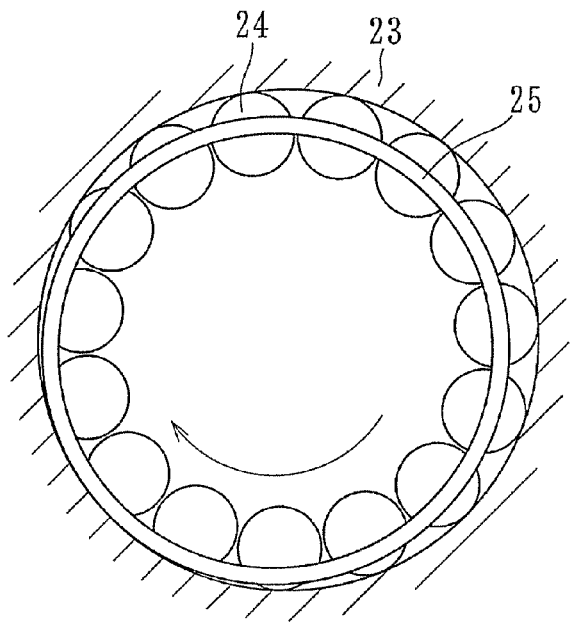
FIG. 4B is a sectional view illustrating a relation between the retainer and the outer race of the tapered roller bearing at an initial stage of rotation.
Figure 4C:
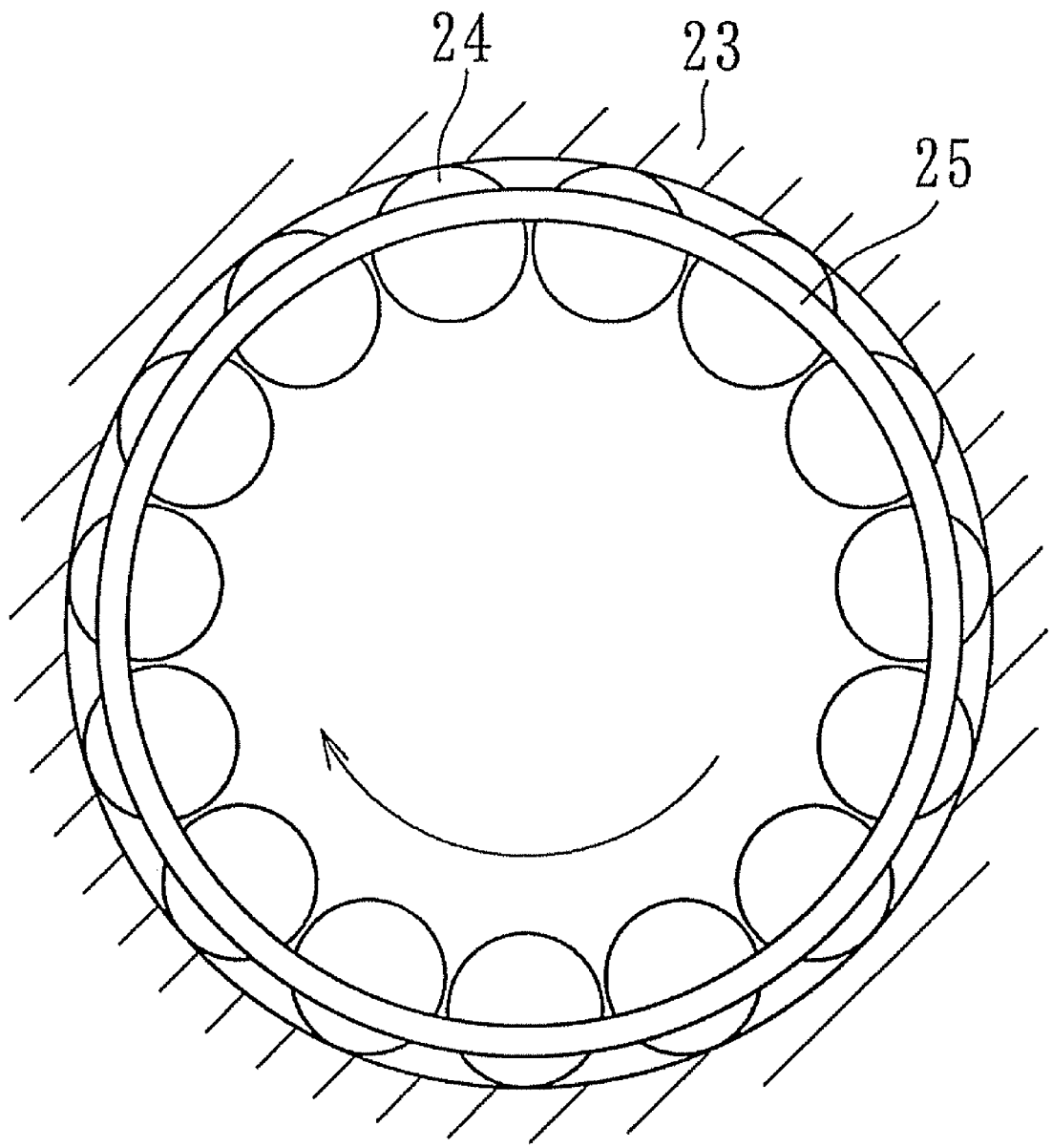
FIG. 4C is a sectional view illustrating a relation between the retainer and the outer race of the tapered roller bearing during the rotation.
Figure 5:
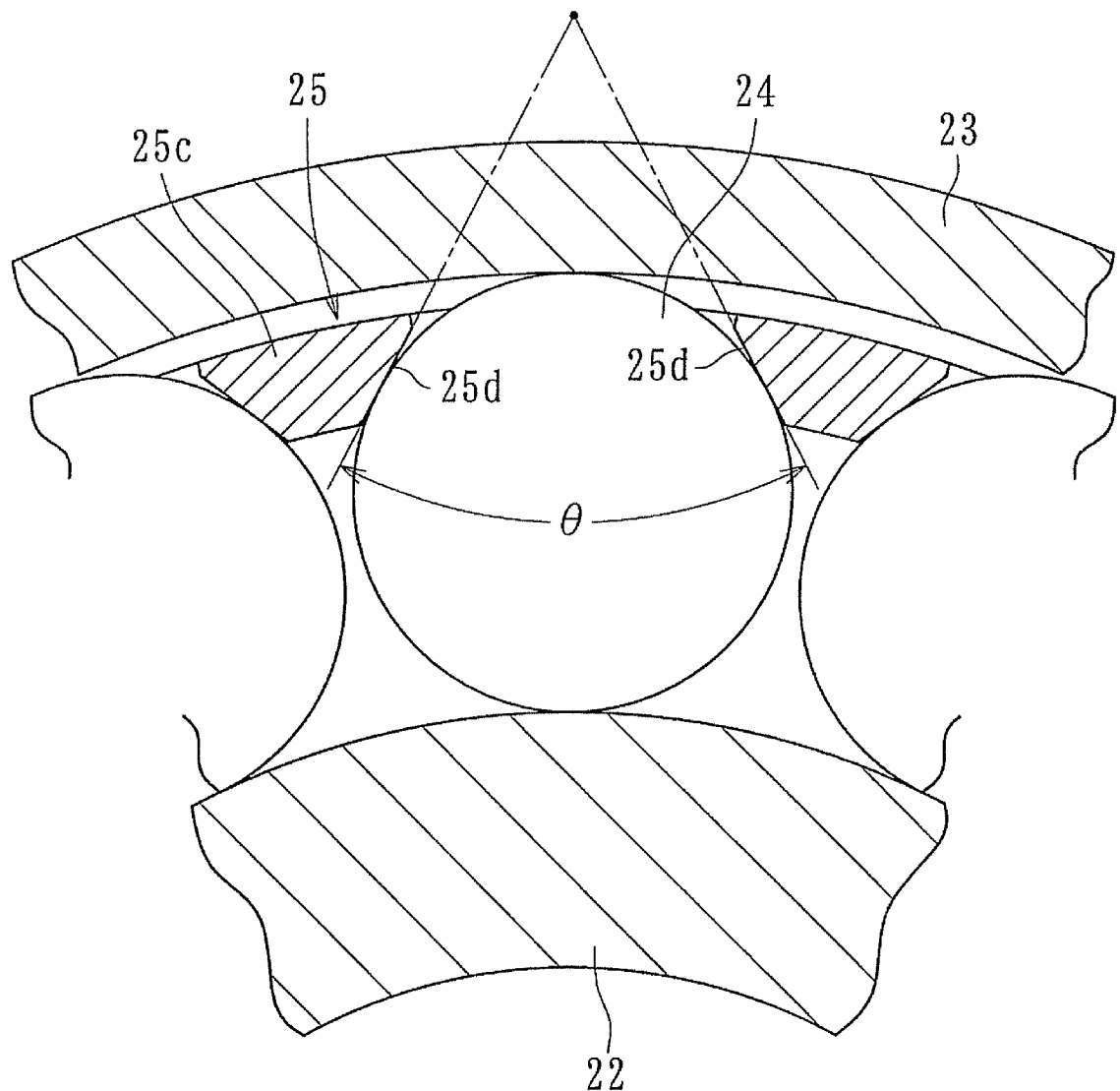
FIG. 5 is an enlarged sectional view of the main part of the tapered roller bearing.
Figure 6:
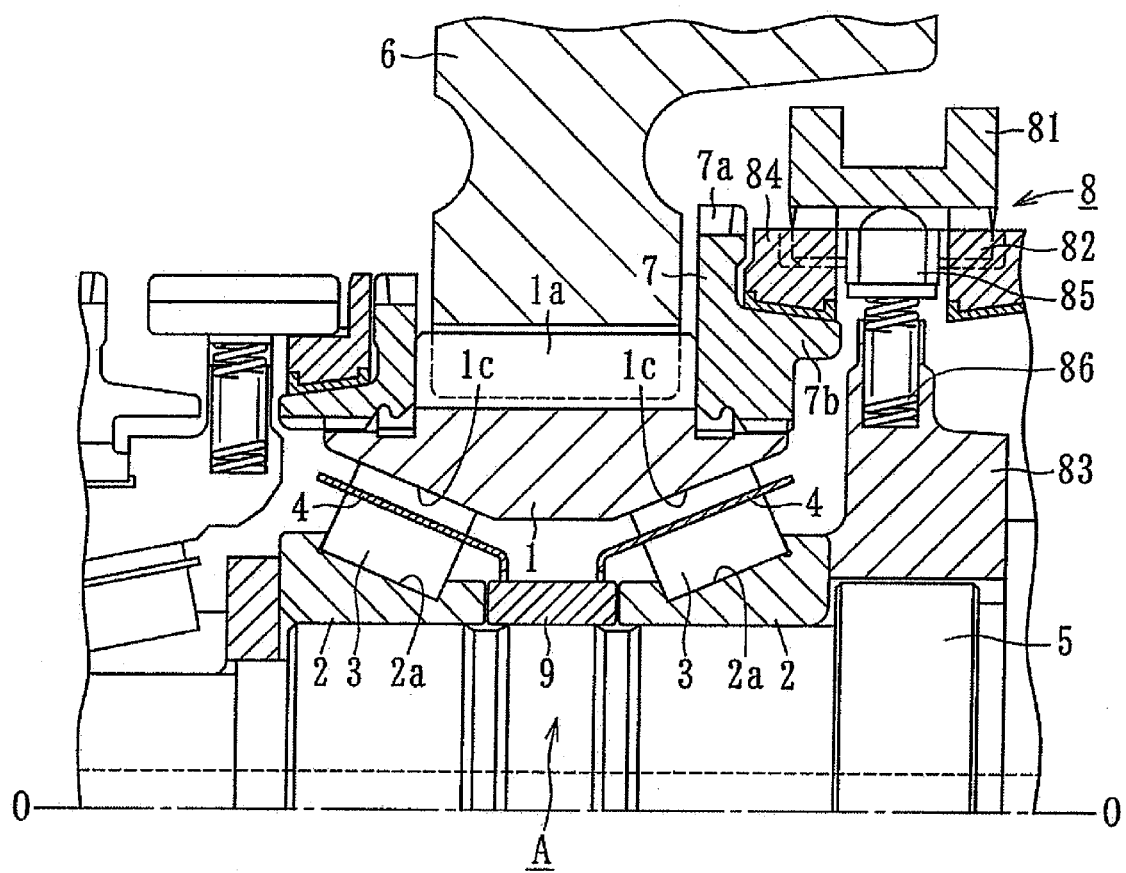
FIG. 6 is a sectional view of a main part of a conventional automobile transmission.

An outer diameter of the retainer 25 is set to have a dimension in which the following is allowed: when the retainer 25 in a state illustrated in FIG. 3A is moved as indicated by an arrow in FIG. 3A to the radially smaller side in the axial direction (FIG. 3B), and then moved to the lower side in the radial direction as illustrated in FIG. 4A, the outer race 23 and a part of the retainer 25 are brought into contact with each other; and when the bearing is rotated and the retainer 25 is subjected to centering as illustrated in FIG. 4C, the retainer 25 and the outer race 23 are brought out of contact with each other through an intermediation of a predetermined gap over the entire circumference. In other words, in the dimension described above, while a gap exists between the retainer 25 and the outer race 23 in the state in which the retainer 25 is positioned at the axial center and the retainer 25 is biased on the radially smaller side as illustrated in FIG. 3B, the outer race 23 and the retainer 25 are brought into contact with each other when the retainer 25 is moved from the axial center to the radial direction.

With this, while being brought into contact with each other at an initial stage of the operation (FIG. 4B), the outer race 23 and the retainer 25 are kept out of contact with each other during the operation (FIG. 4C), and hence it is possible to suppress an increase in drag torque and abrasion due to contact. Note that, while it is necessary to perform bottom-widening or caulking in the case of a retainer made of iron plate, it is unnecessary to perform the same in the case of a retainer made of a resin. Thus, necessary dimensional accuracy is easily secured. Herein, the "bottom-widening" represents an increase in diameter of the brace portions on the radially smaller side of the retainer 25 so as to allow, when the retainer 25 having the tapered rollers 24 incorporated therein is assembled to each of the inner races 22, the rollers to climb over the small flange 22b of each of the inner races 22. The "caulking" represents pressing the brace portions on the radially smaller portion of the retainer 25, which are increased in diameter as described above, with use of a die from the outside so as to restore the same.

According to the tapered roller bearing of the present invention, it is possible to set the contact surface pressure between the tapered rollers 24 and the raceway surfaces 23a to be lower than 2,200 MPa, and hence possible to suppress occurrence of fretting without shortening fatigue life thereof. In particular, through $MoS_2$ treatment performed on the surfaces of the tapered rollers 24, it is possible to reduce frictional resistance between the tapered rollers 24 and raceway surfaces 23a of the outer race 23 and the inner races 22. That is, through $MoS_2$ treatment performed on the surfaces of the tapered rollers, even when the contact surface pressure between the tapered rollers and the raceway surfaces does not become lower than 2,200 MPa, it is possible to prevent occurrence of fretting at surface pressure approximate to 2,200 MPa as long as $\alpha/\beta \geq 4.75$ is established. Thus, a relation between the outer-race raceway surface angle and the roller angle is set more easily, which leads to an increase in degree of freedom for design.

In a neutral state of the retainer 25, the retainer 25 and the outer race 23 are kept out of contact with each other so that gaps are formed therebetween, and the retainer 25 in the neutral state is moved in the radial direction so that a part of the retainer 25 is brought into contact with the outer race. With this, PCD can be increased. In addition, the roller coefficient γ exceeds 0.94, and hence it is possible to increase the width of the brace of the retainer 25 while the outer race 23 and the retainer 25 are kept out of contact with each other in the neutral state. Thus, without changing the bearing dimension, it is possible to increase the load capacity to the same level as that of a full complement roller bearing (bearing without retainer). With this, it is possible to reduce contact surface pressure, the surface pressure in a halt state is lessen, and fretting resistance is enhanced. In addition, an excellent contact state can be secured between the retainer 25 and the tapered rollers 24, and hence the tapered rollers 24 can be smoothly rolled.

Further, setting of the aperture angle θ of the retainer 25 to be 55° or larger allows an excellent contact state to be secured with respect to the tapered rollers 24. Setting of the aperture angle of the retainer 25 to be 80° or smaller prevents an increase in pressing force in the radial direction, and hence the tapered rollers 24 can be smoothly rolled. That is, it is difficult to achieve the excellent contact state with respect to the tapered rollers 24 when the aperture angle θ is smaller than 55°, and pressing force in the radial direction becomes excessively large when the aperture angle θ is larger than 80°. Thus, the tapered rollers 24 cannot be smoothly rolled.

Note that, when the retainer 25 is made of iron plate, it is possible to increase rigidity of the retainer 25 so as to stably retain the tapered rollers 24 over a long period of time. In addition, the retainer 25 is excellent in oil resistance so that material deterioration caused by being dipped to oil can be prevented. The retainer 25 made of a resin is lighterweight and has lower frictional coefficient, and hence is suitable for suppressing torque loss and abrasion of the retainer 25 at the time of activating the bearing.

Hereinabove, description has been made on the embodiment of the present invention. In this context, the present invention is not limited to the above-mentioned embodiment, and various modifications may be made thereto. For example, the number of the tapered rollers 24 to be arranged may be arbitrarily set. Further, for the purpose of increasing strength, the retainer 25 may be formed of resin materials or engineering plastics which are obtained by mixing the resin materials or the other engineering plastics with glass fiber, carbon fiber, or the like.

EXAMPLE

Sample products having various roller angles with respect to the outer-race raceway surface angle were prepared so as to confirm whether or not fretting occurs in each of the sample products. Table 1 shows the results. Conditions of the samples in Table 1 are as follows:
a sample a: $\alpha=12°30'$, $\beta=3°35'$, and $\alpha/\beta=3.49$,
a sample b: $\alpha=14°$, $\beta=3°31'$, and $\alpha/\beta=3.98$,
a sample c: $\alpha=17°$, $\beta=3°45'$, and $\alpha/\beta=4.58$,
a sample d: $\alpha=18°3'$, $\beta=3°49'$, and $\alpha/\beta=4.73$,
a sample e: $\alpha=19°2'$, $\beta=3°54'$, and $\alpha/\beta=4.88$, and
a sample f: $\alpha=20°$, $\beta=3°46'$, and $\alpha/\beta=5.31$.
Note that, each of the samples includes rollers of the following two types: normal rollers (not subjected to $MoS_2$ treatment) and $MoS_2$ rollers (subjected to $MoS_2$ treatment). In the conventional tapered rollers of those types, $\alpha/\beta<4.6$ is generally established.

TABLE 1

| | $\alpha/\beta$ | Maximum contact-surface pressure | Occurrence of fretting | |
|---|---|---|---|---|
| | | | Normal rollers | $MoS_2$ rollers |
| a | 3.49 | 2,500 MPa | Confirmed | Confirmed |
| b | 3.98 | 2,400 MPa | Confirmed | Confirmed |
| c | 4.53 | 2,300 MPa | Confirmed | Confirmed |
| d | 4.73 | 2,200 MPa | Confirmed | Minor |
| e | 4.88 | 2,100 MPa | Minor | None |
| f | 5.31 | 1,950 MPa | None | None |

As can be seen from Table 1, when $\alpha/\beta=4.73$ was established, the maximum contact-surface pressure was 2,200

MPa, fretting occurred in the normal rollers, and minor fretting occurred in the MoS$_2$ rollers. Further, when α/β=4.88 was established, the maximum contact-surface pressure was 2,100 MPa, and fretting did not occur in the MoS$_2$ rollers while minor fretting occurred in the normal rollers. When α/β=5.31 was established, the maximum contact-surface pressure was 1,950 MPa, and fretting did not occur in the normal rollers nor the MoS$_2$ rollers.

Thus, fretting does not occur in the normal rollers when α/β≧4.9 is established, and fretting does not occur in the MoS$_2$ rollers when α/β≧4.75 is established.

Industrial Applicability

The present invention is particularly applicable to a tapered roller bearing used in an idler portion of an automobile transmission (transmission).

The invention claimed is:

1. A tapered roller bearing for an idler portion of an automobile transmission, the tapered roller bearing comprising:
    an outer race having a tapered raceway surface;
    an inner race;
    a plurality of tapered rollers interposed between the outer race and the inner race; and
    a retainer for retaining the tapered rollers,
    wherein the tapered roller bearing is positionable in an idle state in which the outer race idles with respect to the inner race and a shift state in which the outer race and the inner race rotate synchronously with each other, and
    wherein α/β≧4.9, α being an angle between the tapered raceway surface of the outer race and a central axis of the tapered roller bearing, and β being a conical angle of a tapered outer surface of one of the tapered rollers, and
    wherein β is 3° 46'.

2. A tapered roller bearing according to claim 1, wherein a roller coefficient γ exceeds 0.94,
    the roller coefficient γ=(Z·DA)/(π·PCD),
    where Z is a number of the tapered rollers, DA is an average diameter of the tapered rollers, and PCD is a pitch circle diameter of the tapered rollers.

3. A tapered roller bearing according to claim 1, wherein an aperture angle formed between brace surfaces of a pocket of the retainer is set to 55° or larger and 80° or smaller.

4. A tapered roller bearing according to claim 1, wherein the retainer is made of a resin.

5. A tapered roller bearing according to claim 4, wherein the resin used for forming the retainer comprises polyamide and polyphenylene sulfide.

6. A tapered roller bearing for an idler portion of an automobile transmission, the tapered roller bearing comprising:
    an outer race having a tapered raceway surface;
    an inner race;
    a plurality of tapered rollers interposed between the outer race and the inner race; and
    a retainer for retaining the tapered rollers,
    wherein the tapered roller bearing is positionable in an idle state in which the outer race idles with respect to the inner race and a shift state in which the outer race and the inner race rotate synchronously with each other,
    wherein a tapered outer surface of each of the tapered rollers has a MoS$_2$ treatment layer formed thereon, and
    wherein α/β≧4.75, α being an angle between the tapered raceway surface of the outer race and a central axis of the tapered roller bearing, and β being a conical angle of the tapered outer surface of one of the tapered rollers, and
    wherein β is 3° 46' to 3°54'.

7. A tapered roller bearing according to claim 6, wherein a roller coefficient γ exceeds 0.94,
    the roller coefficient γ=(Z·DA)/(π·PCD),
    where Z is a number of the tapered rollers, DA is an average diameter of the tapered rollers, and PCD is a pitch circle diameter of the tapered rollers.

8. A tapered roller bearing according to claim 6, wherein an aperture angle formed between brace surfaces of a pocket of the retainer is set to 55° or larger and 80° or smaller.

9. A tapered roller bearing according to claim 6, wherein the retainer is made of a resin.

10. A tapered roller bearing according to claim 9, wherein the resin used for forming the retainer comprises polyamide and polyphenylene sulfide.

* * * * *